(12) United States Patent
Futami

(10) Patent No.: US 7,470,050 B2
(45) Date of Patent: Dec. 30, 2008

(54) VEHICLE LIGHT

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 43 days.

(21) Appl. No.: 11/616,972

(22) Filed: Dec. 28, 2006

(65) Prior Publication Data

US 2007/0147058 A1  Jun. 28, 2007

(30) Foreign Application Priority Data

Dec. 28, 2005  (JP) ............................. 2005-378244

(51) Int. Cl.
*F21V 7/00* (2006.01)
(52) U.S. Cl. .................. 362/514; 362/538; 362/529; 362/518; 362/507
(58) Field of Classification Search ................ 362/514, 362/507, 538, 518, 539
See application file for complete search history.

(56) References Cited

U.S. PATENT DOCUMENTS

| | | | | |
|---|---|---|---|---|
| 5,140,504 | A * | 8/1992 | Sato | 362/517 |
| 5,190,368 | A * | 3/1993 | Sekiguchi | 362/539 |
| 5,436,807 | A * | 7/1995 | Kobayashi | 362/41 |
| 6,821,004 | B2 * | 11/2004 | Tatsukawa et al. | 362/465 |
| 6,821,005 | B2 * | 11/2004 | Uchida et al. | 362/466 |
| 7,281,830 | B2 * | 10/2007 | Ishida | 362/538 |
| 7,316,495 | B2 * | 1/2008 | Watanabe et al. | 362/545 |
| 2002/0163814 | A1 * | 11/2002 | Hayami et al. | 362/466 |
| 2004/0213012 | A1 | 10/2004 | Fukawa et al. | |
| 2006/0028833 | A1 * | 2/2006 | Yagi et al. | 362/538 |

FOREIGN PATENT DOCUMENTS

JP     2004327187      11/2004

* cited by examiner

*Primary Examiner*—Ali Alavi
*Assistant Examiner*—Evan Dzierzynski
(74) *Attorney, Agent, or Firm*—Cermak Kenealy Vaidya & Nakajima LLP

(57) ABSTRACT

A projector type vehicle light can provide an improved far distance visibility in a highway mode and other improved headlight performances by switching the low beam distribution and the highway mode light distribution while utilizing AFS functions. The projector type vehicle light can include a first lamp unit and a second lamp unit. The first lamp unit includes a light source, a reflector, a projection lens, and a light-shading member, and is configured to reflect light from the light source by means of the reflector and project light in the forward direction by the projection lens. The second lamp unit can have almost the same configuration as the first lamp unit and is located adjacent to the first lamp unit and either above or below it. The cut-off line formed by the first lamp unit can be located at an angular position below the horizontal line by 0.57 degrees in order to form a low beam distribution for an ordinary road. The cut-off line formed by the second lamp unit can be located at an angular position below the horizontal line by 0.4 or 0.23 degrees in order to form a highway mode light distribution.

15 Claims, 7 Drawing Sheets

VEHICLE LIGHT

BACKGROUND

This application claims the priority benefit under 35 U.S.C. § 119 of Japanese Patent Application No. 2005-378244 filed on Dec. 28, 2005, which is hereby incorporated in its entirety by reference.

1. Field

The presently disclosed subject matter relates to vehicle lights, and in particular, relates to a projector type vehicle light, such as a vehicle headlight provided in front of the vehicle body, a vehicle auxiliary headlight, a spot light, signal lights, a traffic light, and the like.

2. Description of Related Art

FIG. 1 is a cross sectional view of a conventional vehicle headlight. The vehicle headlight 1 shown in FIG. 1 includes a bulb 2 serving as a light source, a reflector 3, a projection lens 4, and a light-shading member 5.

The reflector 3 is composed of an elliptic surface having a first focus (rear focus) and a second focus (front focus), such that the bulb 2 is located in the vicinity of the first focus. The major axis thereof horizontally extends in the forward direction. The inside surface thereof serves as the reflecting surface. Examples of the elliptic reflecting surface include a revolved ellipsoid, an elliptic cylinder, a free curved surface based on an elliptic surface, and the like.

The projection lens 4 can include a convex lens having a rear focus (light source side) in the vicinity of the second focus of the reflector 3. The projection lens 4 is configured to converge the light received directly from the bulb 2 or light reflected by the reflector 3 to irradiate the converged light in the forward direction.

The light-shading member 5 is inserted in a light path to impart a desired light distribution pattern for passing-by type traveling (hereinafter, simply referred to as a "low beam" or "low beam distribution") to the light irradiated in the forward direction. In reality, the light-shading member 5 is placed in the vicinity of the second focus of the reflector 3. The upper edge 5a thereof is formed into a desired form to shape the light distribution pattern with a cut-off line.

In the thus configured vehicle headlight 1, when the bulb 2 is energized, the light emitted therefrom travels directly in the forward direction or by being reflected by the reflector 3 to the vicinity of the second focus of the reflector 3. Thereafter, the light is converged by the projection lens 4 to be irradiated in the forward direction. At this time, part of the light passing in the vicinity of the light-shading member 5 is shaded by the member 5 to form a cut-off line by means of the upper edge 5a of the light-shading member 5. Accordingly, the light is irradiated as a low beam in the forward direction.

The formed cut-off line is projected by the projection lens 4 so as to form the cut-off line in the light distribution pattern in which the line extends from the center to the right slightly downward with respect to a horizontal line and from the center to the left side along the horizontal line in the case in which a headlight is used for a right-side traffic system. Therefore, the thus formed light distribution pattern extends on the lower side of the cut-off line. In other words, the light is irradiated so as to be suitable as a low beam.

In an actual case, the light distribution pattern is formed such that the light on the right side in the forward direction reaches relatively shorter distance and the light on the left side reaches relatively longer distance.

In the projector type vehicle headlight 1, the light-shading member 5 can be withdrawn from the light path to form another light distribution pattern for normal traveling (hereinafter referred to as a "high beam" or "high beam distribution").

In the vehicle headlight 1 configured as described above, the low beam distribution pattern formed by the cut-off line is unchanged. In contrast to this, vehicle headlights having a controllable light distribution function which is commonly referred to as an adaptive front lighting system (AFS) have been commercially available recently. The AFS can direct the light distribution pattern of a headlight toward the traveling direction even when the vehicle travels along a curved road, thereby improving the visibility along the traveling direction. In addition to this, recent AFSs can provide a highway mode light distribution in which a distance visibility can be improved when traveling on a highway. An adverse weather mode light distribution can also be provided which is formed in consideration with visibility when traveling in the rain. An urban mode light distribution can be provided which is formed in consideration of preventing the dazzling of pedestrians when traveling on an urban road, and the like. These additional dedicated light distribution patterns have respective light distribution pattern specifications that are relatively newly introduced. In particular, the highway mode light distribution has an improved far distance visibility. To cope with this, the required luminous intensity for the low beam distribution in accordance with the light distribution specification therefor is increased from the upper limit of approximately 45,000 cd to approximately 80,000 cd. In addition to this, in some cases, the regulation for the angular position of the formed cut-off line is relaxed to some extent with respect to the conventional horizontally extending line.

One way to achieve certain features of the AFS as described above is via a vehicle headlight disclosed in Japanese Patent Laid-Open Publication No. 2004-327187 (corresponding to U.S. Patent Application Publication No. 2004/0213012). The vehicle headlight includes a first movable light-shading member configured to form a cut-off line for a low beam distribution, a second movable light-shading member shading the light irradiated on the road surface near the front of the vehicle body, and a leveling mechanism. The vehicle headlight can adjust the angular position of the cut-off line in the vertical direction by means of these components. In the vehicle headlight disclosed in these publications, the light-shading member forming the cut-off line for the low beam distribution is configured to adjust the cut-off angular position by 0.34 degrees upwards in order to reduce the shading amount of light. We ill now consider a case wherein a projection lens having a focus distance of, for example, approximately 40 mm is employed. In this case, the angular shift of the cut-off line by approximately 1 degree may correspond to 1 mm at the focus position of the projection lens. Therefore, in order to achieve the angular shift of the cut-off line by 0.34 degrees, it is necessary to precisely position the light-shading member by 0.34 mm, namely, in 1/100 mm order. This requires a complicated and accurately controllable movable structure for use as the light-shading member, resulting in increased manufacturing cost. In addition to this, mass production thereof is difficult due to the reliability and durability.

Now, a case will be considered wherein the conventional projector type vehicle headlight 1 can provide a highway mode light distribution which requires a far distance visibility. In this case, when the vehicle headlight 1 is provided with a vertical leveling mechanism to upwardly move the entire lamp unit, and the angular position of the cut-off line is shifted by 0.34 degrees, the maximum luminous intensity would be unchanged.

On the contrary, when the shaded light amount by the light-shading member is reduced to shift the angular cut-off position by an upward amount of 0.34 degrees, there is still a problem of positioning accuracy of the light-shading member. As a result, the obtained luminous intensity is increased only by 2,000 or 3,000 cd. Therefore, it is possible that enough far distance visibility cannot be attained, and a driver cannot clearly recognize the switching of modes from the normal mode light distribution to the highway mode light distribution.

SUMMARY

The presently disclosed subject matter takes into consideration the foregoing and other problems and characteristics of vehicle lights. According to an aspect of the presently disclosed subject matter a projector type vehicle headlight can be configured to provide a low beam distribution and a highway mode light distribution of AFS function and to improve the performance thereof including the far distance visibility during highway driving.

According to another aspect of the presently disclosed subject matter a vehicle headlight can include a first lamp unit and a second lamp unit. The first lamp unit can include: a first light source having an optical axis which horizontally extends in a forward direction; a first elliptic reflector having a first focus and a second focus, configured to reflect light from the first light source in the forward direction, the first focus being located in the vicinity of the first light source, the second focus being located on the optical axis of the first light source; a first convex projection lens having a focus on the first light source side which is located on the optical axis of the first light source and in the vicinity of the second focus of the first elliptic reflector; and a first light-shading member located in the vicinity of the second focus of the first elliptic reflector, having an upper edge configured to form a cut-off line in a light distribution pattern. The second lamp unit can include: a second light source having an optical axis which horizontally extends in the forward direction; a second elliptic reflector having a first focus and a second focus, configured to reflect light from the second light source in the forward direction, the first focus being located in the vicinity of the second light source, the second focus being located on the optical axis of the second light source; a second convex projection lens having a focus on the second light source side which is located on the optical axis of the second light source and in the vicinity of the second focus of the second elliptic reflector; and a second light-shading member located in the vicinity of the second focus of the second elliptic reflector, having an upper edge configured to form a cut-off line in another light distribution pattern, wherein the second lamp unit is located adjacent to the first lamp unit and vertically above or below the first lamp unit.

The vehicle headlight as described above can further include a movable mirror, and an opening may be provided at a boundary between the adjacent first and second lamp units. In this instance, the movable mirror may be movable between an insertion position at which the movable mirror can reflect the light from the first lamp unit toward the second elliptic reflector of the second lamp unit through the opening and a withdrawn position at which the movable mirror is withdrawn from both light paths of the first and second lamp units.

In the vehicle headlight as described above, the first lamp unit may be configured to form a low beam light distribution pattern for passing-by traveling when traveling on an ordinary road by means of the first light-shading member configured to allow the cut-off line to be located at an angular position below a horizontal line by a predetermined angle. In addition to this, the second lamp unit may be configured to form a high beam light distribution pattern for traveling on a highway by means of the second light-shading member configured to allow the cut-off line to be located at an angular position below a horizontal line by a smaller angle than the predetermined angle.

In this case, the predetermined angle is 0.57 degrees, and the smaller angle than the predetermined angle is 0.4 degrees or 0.23 degrees.

In the vehicle headlight as described above, when traveling on an ordinary road, it may only be desired to use the first lamp unit. However, when traveling on a highway, both the first lamp unit and the second lamp unit may be simultaneously turned on.

The vehicle headlight as described above may further include a swing mechanism configured to integrally swing the first lamp unit and the second lamp unit in the horizontal direction with respect to the traveling direction when traveling along a curved road.

The vehicle headlight as described above may further include a leveling mechanism configured to integrally swing the first lamp unit and the second lamp unit in a front-to-rear direction around a horizontal axis of the lamp unit extending in right and left directions. In this instance, the leveling mechanism can maintain the optical axes of the first and second lamp units when a vehicle body slants in a pitching direction.

According to the above-described configuration of the vehicle headlight, when traveling on an ordinary road, the light source of the first lamp unit is energized. The light emitted from the light source of the first lamp unit travels directly in the forward direction or by being reflected by the reflector to the second focus of the reflector. Then, the light is irradiated in the forward direction through the projection lens. Therefore, the cut-off line can be formed by the light-shading member. This can form a light distribution pattern for a low beam to prevent dazzling of the opposite vehicle or pedestrians when traveling on an ordinary road.

On the other hand, when traveling on a highway, only the light source of the second lamp unit can be energized, if desired. The light emitted from the light source of the second lamp unit travels directly in the forward direction or by being reflected by the reflector to the second focus of the reflector. Then, the light is irradiated in the forward direction through the projection lens. In this case, the second lamp unit is configured to irradiate light with a relatively narrow angular range around the front center so as to provide a highway mode light distribution. This can increase the maximum luminous intensity of the light distribution pattern as compared to the case wherein the first lamp unit is activated when traveling on an ordinary road, thereby improving the far distance visibility. Accordingly, the vehicle headlight can provide a light distribution pattern suitable for traveling on a highway. In addition to this, the improved maximum luminous intensity can provide a distinct switching sense that a driver can clearly recognize.

In this case, the light-shading member of the second lamp unit is configured to form its cut-off line at an angular position shifted downward by 0.4 degrees from the horizontal line in accordance with the Japanese government standard. Alternatively, the light-shading member of the second lamp unit is configured to form its cut-off line at an angular position shifted downward by 0.23 degrees from the horizontal line in accordance with US or EP government standard.

In an alternative exemplary embodiment, the second lamp unit is integrally secured to the first lamp unit. In this case, it is not necessary to provide a complicated movable mechanism with the units, thereby achieving a high positioning accuracy. Accordingly, the vehicle headlight can achieve a reliable AFS function with simple configuration and low cost.

When traveling on an ordinary road, only the first lamp unit may be turned on, while both the first and second lamp units may be simultaneously turned on when traveling on a highway. In this case, because the first lamp unit can irradiate light with a relatively wide angular range, the second lamp unit should irradiate light concentrated only around the center area. Accordingly, the vehicle headlight can increase the maximum luminous intensity of the light distribution pattern around the center area, thereby improving the far distance visibility.

In addition to this, the second lamp unit can be simultaneously turned on during highway travel. Accordingly, as compared to the case wherein the movable shutter is used for switching light distribution patterns in a conventional manner, since the vehicle headlight does not necessarily employ any shutter for switching light distribution patterns, there can be little or no error in the light amount shaded by the shutter, thereby efficiently using the light from the light source. The second lamp unit can additionally be turned on to increase the luminous intensity, thereby providing a distinct switching sense that a driver can clearly recognize. Accordingly, the vehicle headlight can have improved safety features. Furthermore, the vehicle headlight does not need a complicated movable mechanism. This can improve its reliability as well as intrinsic commercial value.

When the vehicle headlight has a swing mechanism in the horizontal direction, the light from the first and second lamp units is irradiated in the traveling direction of the vehicle. This configuration can improve the visibility, for example, during traveling along a curved road. The swing mechanism can integrally swing the first and second lamp units in the horizontal direction. This means that a simple swing mechanism can be achieved with low cost.

The vehicle headlight may also have a leveling mechanism configured to integrally swing the first and second lamp units in the front-to-rear direction around a horizontal axis extending in the right-to-left direction. In this instance, the leveling mechanism can maintain the optical axes of the first and second lamp units even when the vehicle body slants in the pitching direction. For example, even when heavy baggage is loaded on the vehicle's trunk or the vehicle accelerates or decelerates, vehicle load changes, etc., the optical axes of the units can be maintained in a proper direction. Therefore, a substantially constant light distribution pattern in the longitudinal direction can be attained by the leveling mechanism. This can prevent dazzling light being incident upon oncoming vehicle(s) or pedestrian(s) because the optical axes are not swung upward with respect to the road surface. Also, this can assure a sufficient amount of front visibility because the optical axes are not swung downward with respect to the road surface.

When the vehicle headlight includes a movable mirror located at the insertion position for use in an adverse weather mode, the first and second lamp units can be turned on under the adverse weather conditions. At the same time, the movable mirror can be arranged at the insertion position to reflect the light which is otherwise irradiated from the first lamp unit to the road surface in front of the vehicle body. Then, the light reflected by the movable mirror is directed to the light source of the second lamp unit, and then is reflected by the reflector of the second lamp unit in the forward direction. Accordingly, the light reflected by the movable mirror can be efficiently utilized by being irradiated within the light distribution pattern of the second lamp unit.

When traveling on an ordinary road, the first lamp unit can form an appropriate light distribution pattern for a low beam with its maximum luminous intensity satisfying the standard for the low beam. When traveling on a highway, the second lamp unit can form an appropriate light distribution pattern for a highway mode with its maximum luminous intensity satisfying the standard for the highway mode. In this case, the switching operation from the ordinary road mode to the highway mode is only to turn on the second lamp unit. Namely, the vehicle headlight in accordance with the presently disclosed subject matter can provide a distinct switching sense a driver can recognize simply by adding the highway mode light distribution pattern by the second lamp unit to the low beam distribution pattern by the first lamp unit. This means any movable mechanism for switching is not necessary. Accordingly, the presently disclosed subject matter can achieve the formation of proper light distribution patterns with cut-off line located at a desired angular position with high positioning accuracy, simple configuration, and low cost.

When the first and second lamp units are integrally swung in the horizontal or front-to-rear direction, the AFS function can be facilitated to properly direct the light distribution patterns towards the traveling direction of the vehicle, for example, along a curved road, by easily adjusting the optical axes of the units by means of the swing mechanism or the leveling mechanism.

As described above, the presently disclosed subject matter can include an embodiment of a projector type vehicle headlight which can provide an improved far distance visibility in a highway mode and other improved headlight performances by switching the low beam distribution and the highway mode light distribution while including the AFS functional characteristics.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

Hereinafter, exemplary embodiments of the presently disclosed subject matter will be described in further detail with reference to the accompanying drawings of FIGS. 2 to 10.

Figure 2:
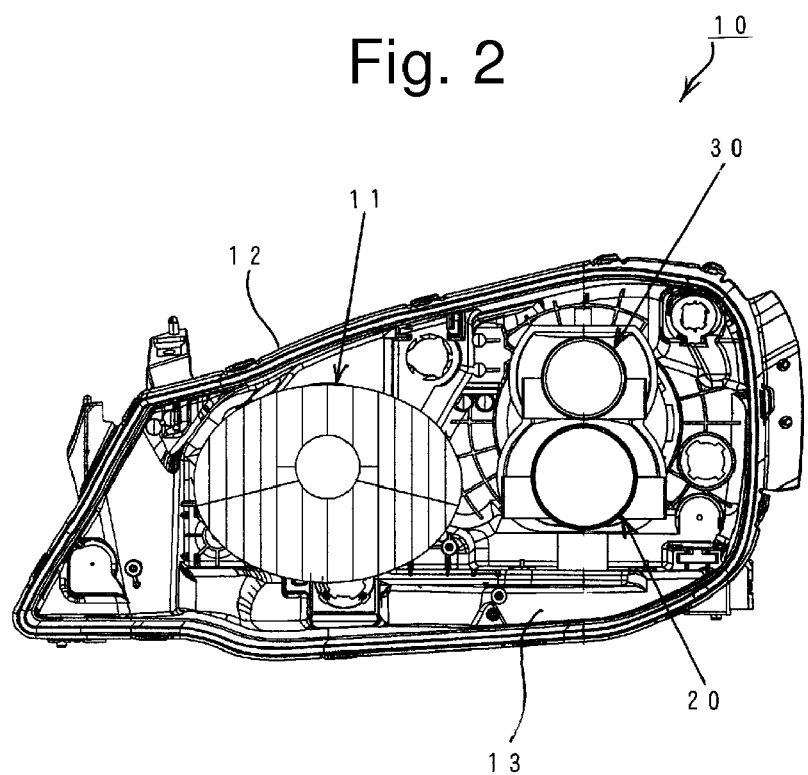
FIG. 2 is a schematic front view showing a configuration of a vehicle headlight in accordance with one exemplary embodiment of the presently disclosed subject matter.

FIG. 2 shows an exemplary embodiment of a vehicle headlight made in accordance with the principles of the presently disclosed subject matter.

In FIG. 2, the vehicle headlight 10 is configured to include a high-beam lamp unit 11. A first lamp unit 20 and a second lamp unit 30 can be included and configured to form a low beam distribution. The headlight 10 can also include a common housing 12 and a front lens 13.

The high-beam lamp unit 11 can be one selected from those known and typically used in the art.

Figure 1:
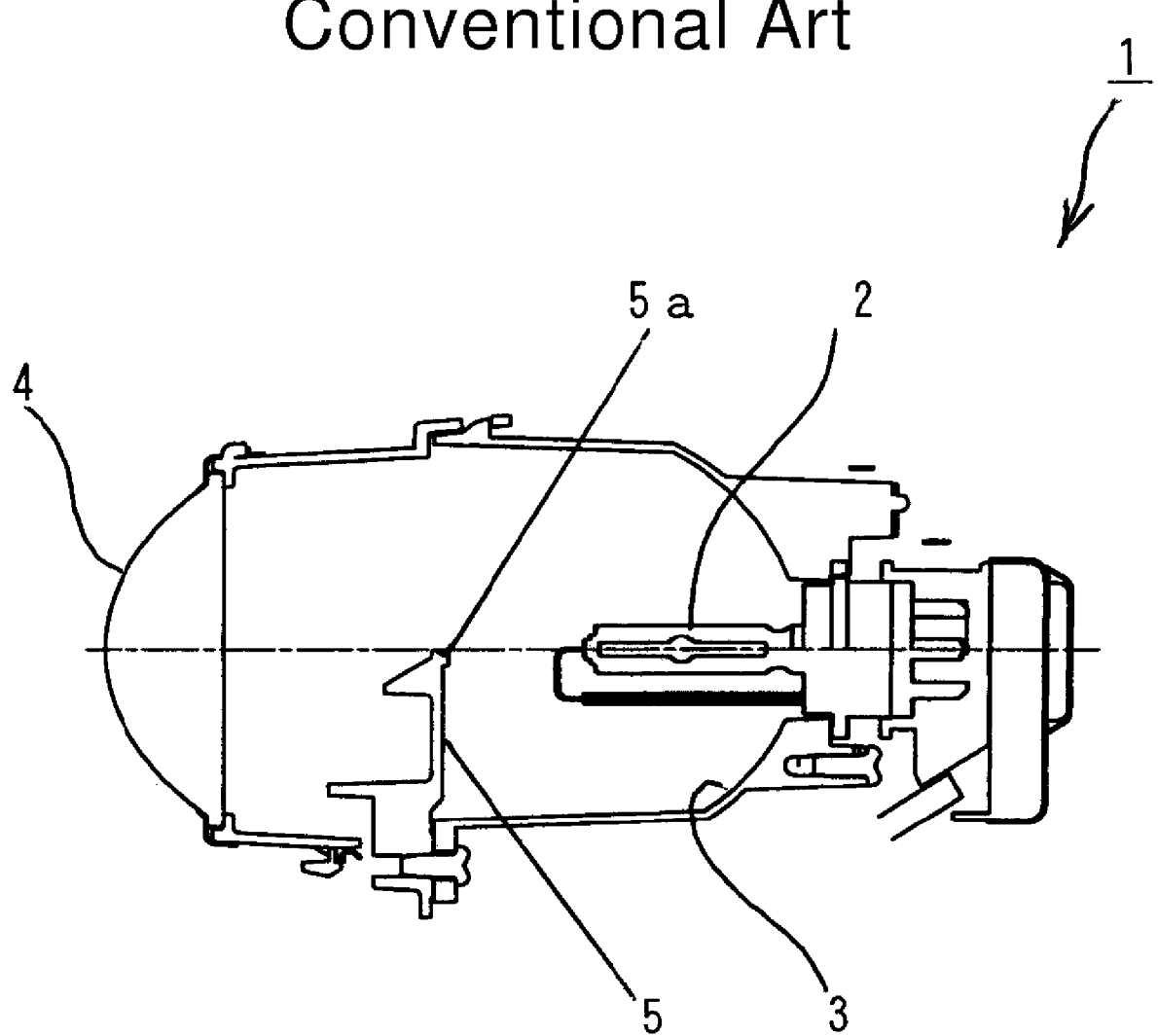
FIG. 1 is a schematic cross sectional view showing one example of a conventional vehicle headlight.
Figure 3:
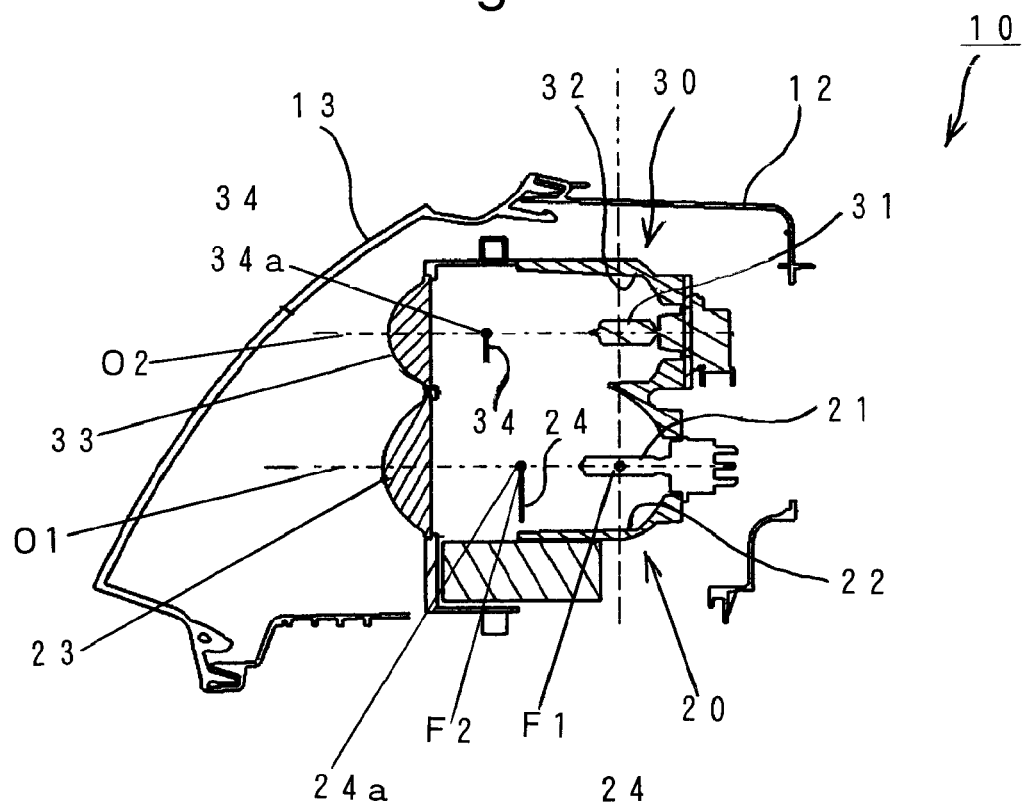
FIG. 3 is a schematic cross sectional view showing the vehicle headlight of FIG. 2.

The first low-beam lamp unit 20 can have a configuration that is similar to the conventional projector type vehicle headlight as shown in FIG. 1, and can be used for traveling on an ordinary road. FIG. 3 shows a cross sectional view of the first lamp unit 20. The first lamp unit 20 is configured to include a bulb 21 serving as a light source, a reflector 22 for reflecting light from the bulb 21 in the forward direction, a projection lens 23 located in front of the reflector 22, and a light-shading member 24 located between the reflector 22 and the projection lens 23.

The bulb 21 can be one used for a common vehicle headlight, auxiliary light, etc. Examples of the bulb include, but are not limited to, a filament lamp, a halogen lamp with or without an IR reflecting film, a discharge lamp such as a metal halide lamp, and the like. The bulb 21 is arranged such that the optical axis O1 thereof is horizontally aligned and extends forward. The bulb 21 is secured by a socket, through which the bulb 21 is energized.

The reflector 22 can include a concave reflecting surface opened toward the front side so as to reflect light from the bulb 21 in the forward direction. The reflecting surface thereof is an elliptic surface having a first focus F1 and a second focus F2. The reflector 22 can be arranged such that the light emitting point of the bulb 21 is located in the vicinity of the first focus F1 and the second focus F2 is positioned on the optical axis O1 of the bulb 21 extending forward. Examples of the elliptic reflecting surface include, but are not limited to, a revolved ellipsoid, an elliptic cylinder, a free curved surface based on an elliptic surface, and the like.

The projection lens 23 can be configured to include a convex lens. The projection lens 23 can be located such that the focus thereof on the light source side is positioned on the optical axis O1 and in the vicinity of the second focus F2 of the reflector 22.

The light-shading member 24 can be formed of an opaque material. The upper edge 24a of the light-shading member 24 is arranged in the vicinity of the light-source side focus of the projection lens 23, namely, in the vicinity of the second focus F2 of the reflector 22. The upper edge 24a is designed so as to shape a light distribution pattern for traveling on an ordinary road. In particular, the light-shading member 24 can be designed so as to form a cut-off line in a low beam distribution for traveling an ordinary road, at an angular position below the horizontal line by 0.57 degrees, for example.

The second lamp unit 30 can have similar structure as compared to the first lamp unit 20, but is used for traveling on a highway. The second lamp unit 30 can include a bulb 31 serving as a light source, a reflector 32 for reflecting light from the bulb 31 in the forward direction, a projection lens 33 located in front of the reflector 32, and a light-shading member 34 located between the reflector 32 and the projection lens 33.

The bulb 31, the reflector 32, the projection lens 33, and the light-shading member 34 can be similar in terms of their configurations as compared to those of the first lamp unit 20. However, the second lamp unit 30 can be different from the first lamp unit 20 at least in that the unit 30 irradiates light with a relatively narrow angular range around the front center to a far distance so as to provide a highway mode light distribution.

The light-shading member 34 has an upper edge 24a which is designed so as to shape a light distribution pattern for traveling on a highway. In particular, the light-shading member 34 is designed so as to form a cut-off line in a low beam distribution for traveling a highway, at an angular position below the horizontal line by 0.4 degrees or 0.23 degrees depending on the corresponding specifications, for example. It should be appreciated that the angular position is designed by 0.4 degrees downward in accordance with the Japanese standard while by 0.23 degrees downward in accordance with the U. S. or European standard. Off course, the angular position is not limited to these values, but is appropriately set in accordance with various domestic specifications/standards.

The housing 12 can accommodate the first lamp unit 20, the second lamp unit 30, and the high-beam lamp unit 11 in position within the vehicle body. The front side thereof is opened so that the light is irradiated therethrough.

The front lens 13 is configured to close the open front side of the housing 12 while the light from the respective lamp units 11, 20, and 30 passes through the front lens 13 in the forward direction. The front lens 13 can also protect the interior of the housing 12.

A description will now be given of the operation of the vehicle headlight 10 in accordance with the present exemplary embodiment when traveling on an ordinary road and on a highway.

When traveling on an ordinary road, only the bulb 21 of the first lamp unit 20 is energized via the socket to emit light. The light emitted therefrom travels directly in the forward direction or by being reflected by the reflector 22 to the vicinity of the second focus F2 of the reflector 22. Thereafter, the light is converged by the projection lens 23 to be irradiated in the forward direction.

Figure 4A:
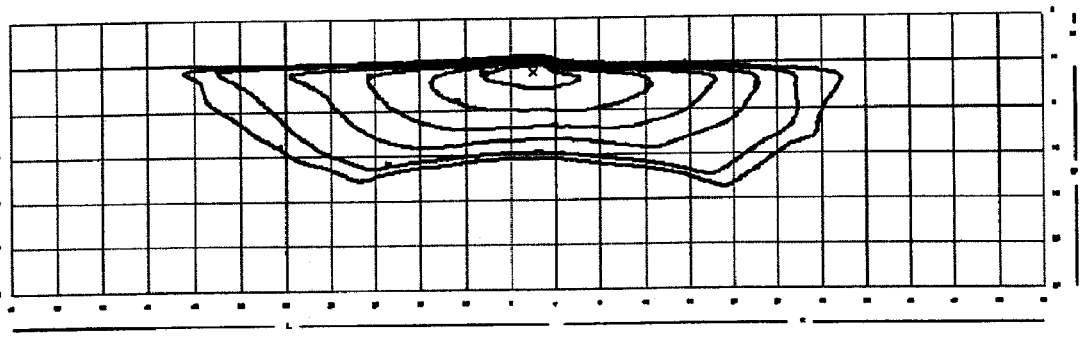
FIGS. 4A and 4B are a graph showing the optimum light distribution pattern for traveling on an ordinary road formed by the first lamp unit of the vehicle headlight of FIG. 2, and a graph showing the light distribution pattern formed by shading part of light by means of the light-shading member of the first lamp unit of the vehicle headlight of FIG. 2, respectively.

At this time, part of the light emitted from the bulb 21 passes in the vicinity of the light-shading member 24 and is shaded by the member 24 to form a cut-off line in the light distribution pattern by means of the upper edge 24a of the light-shading member 24. Accordingly, the light is irradiated with a low beam distribution for an ordinary road as shown in FIG. 4a, the low beam distribution having the same or similar cut-off line as that of the conventional ordinary road configuration. This configuration can prevent the dazzling of the opposite vehicle or pedestrians when traveling on an ordinary road.

When traveling on a highway, in addition to the first lamp unit 20, the bulb 31 of the second lamp unit 30 can be energized. Namely, both the lamp units 20 and 30 are simultaneously turned on. The light emitted from the bulb 31 travels directly in the forward direction or by being reflected by the reflector 32 to the vicinity of the second focus F2 of the reflector 32. Then, the light is converged by the projection lens 33 to be irradiated in the forward direction.

Figure 4B:
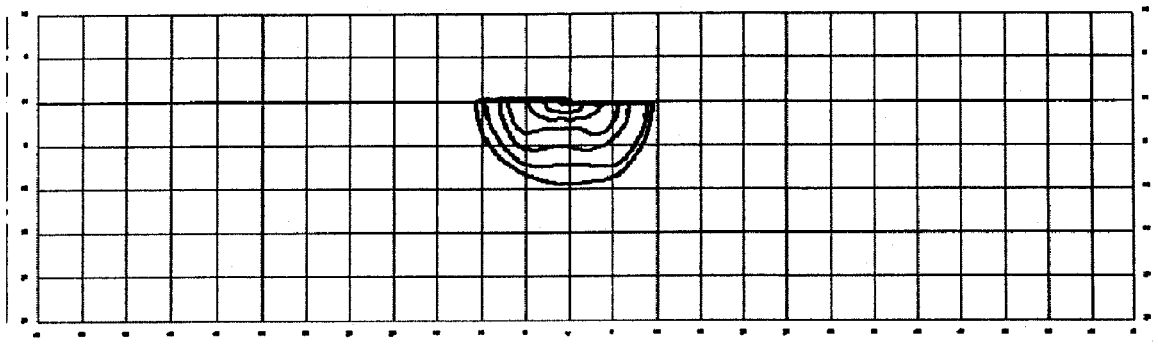

At this time, part of the light emitted from the bulb 31 passes in the vicinity of the light-shading member 34 and is shaded by the member 34 to form a cut-off line in the light distribution pattern by means of the upper edge 34a of the light-shading member 34. Accordingly, the light is irradiated with a light distribution pattern as shown in FIG. 4b, having the cut-off line formed by the upper edge 34a of the light-shading member 34.

By overlaying the respective light distribution patterns formed by the first and second lamp units 20 and 30, the formed cut-off line is shifted upward (for example, by 0.17 degrees or 0.34 degrees) as compared to the light distribution pattern for traveling on an ordinary road. Therefore, the headlight in accordance with the present exemplary embodiment can provide an optimum light distribution pattern for traveling on a highway with excellent far distance visibility.

Figure 6:
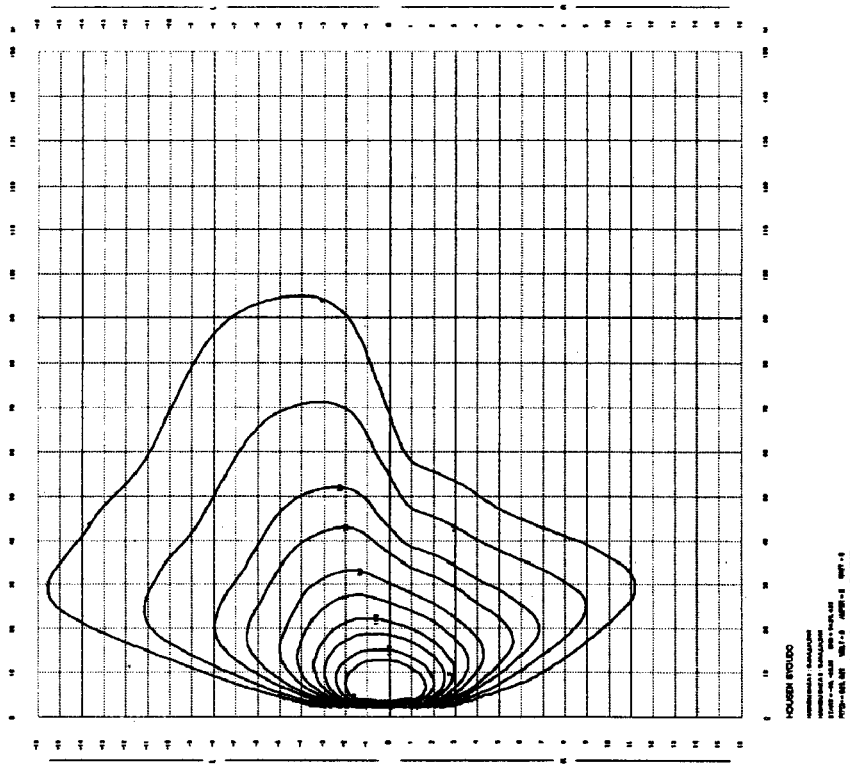
FIG. 6 is a graph showing the low beam light distribution pattern for the vehicle headlight of FIG. 2.

As described above, when traveling on an ordinary road, the headlight can provide the light distribution pattern for an ordinary road as shown in FIG. 4a. In this case, the light distribution pattern on the road is shown in FIG. 6, wherein the light is irradiated with a relatively short distance and a slightly leftward shifted center. This configuration of the vehicle headlight in accordance with the present exemplary embodiment can ensure front visibility.

Figure 5:
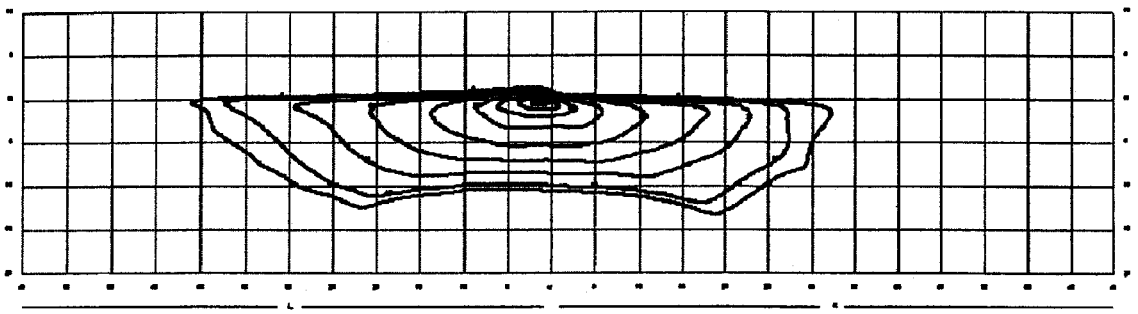
FIG. 5 is a graph showing the light distribution pattern formed by the second lamp unit of the vehicle headlight of FIG. 2.
Figure 7:
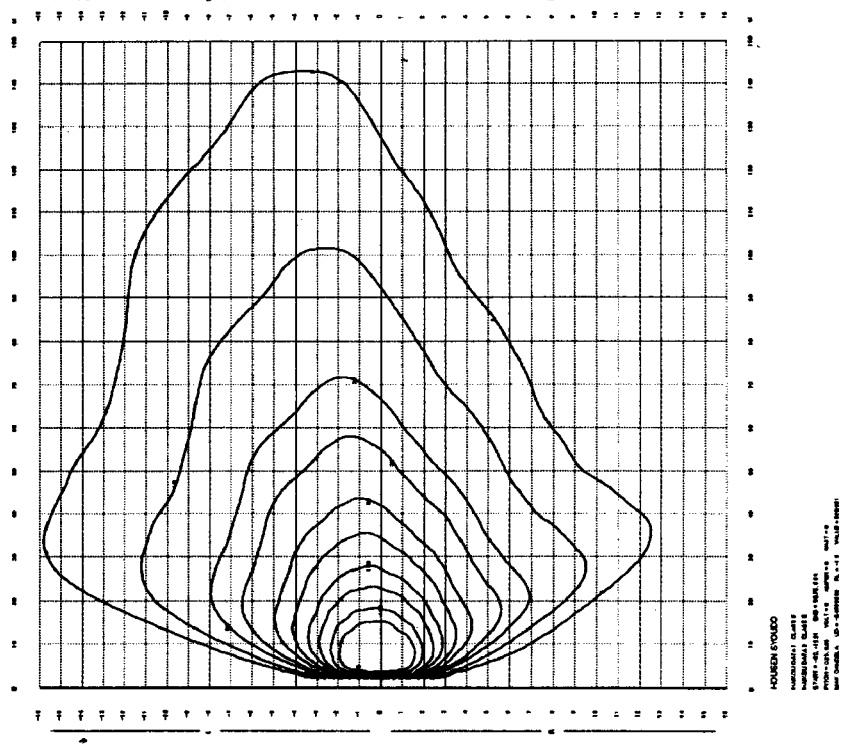
FIG. 7 is a graph showing the high beam light distribution pattern for the vehicle headlight of FIG. 2.

On the contrary, when traveling on a highway, the light distribution pattern for a highway as shown in FIG. 5 can be overlaid on the light distribution pattern for an ordinary road as shown in FIG. 4a. Accordingly, the light distribution pattern on the road surface is shown in FIG. 7, wherein the light is irradiated with a relatively far distance. In this instance, the second lamp unit 30 is designed so as to be dedicated to the case when traveling on a highway. Therefore, the light distribution pattern thereof is formed with a relatively narrow angular range around the center to increase the maximum luminous intensity of the entire vehicle headlight. This configuration of the vehicle headlight in accordance with the present exemplary embodiment can ensure far distance visibility by irradiating light toward far distance locations with increased luminous intensity.

The switch between the light distribution pattern for traveling on an ordinary road and that for traveling on a highway can be achieved simply by turning on/off the second lamp unit 30. This does not require any mechanical means like a movable mechanism for mechanically switching light distribution patterns. Accordingly, this configuration can improve the mechanical reliability of the vehicle headlight and provide a clear switching sense, which a driver can clearly recognize, by increasing the maximum luminous intensity.

The switching of the light distribution patterns between the case when traveling on an ordinary road and the case when traveling on a highway can be determined in accordance with various information. Examples of such information include, but are not limited to, vehicle information such as a vehicle speed, an acceleration opening degree, a steering angle, and external information such as one from ETC (electronic toll collection system for highway), one from GPS (global positioning system), and the like.

Figure 8A:
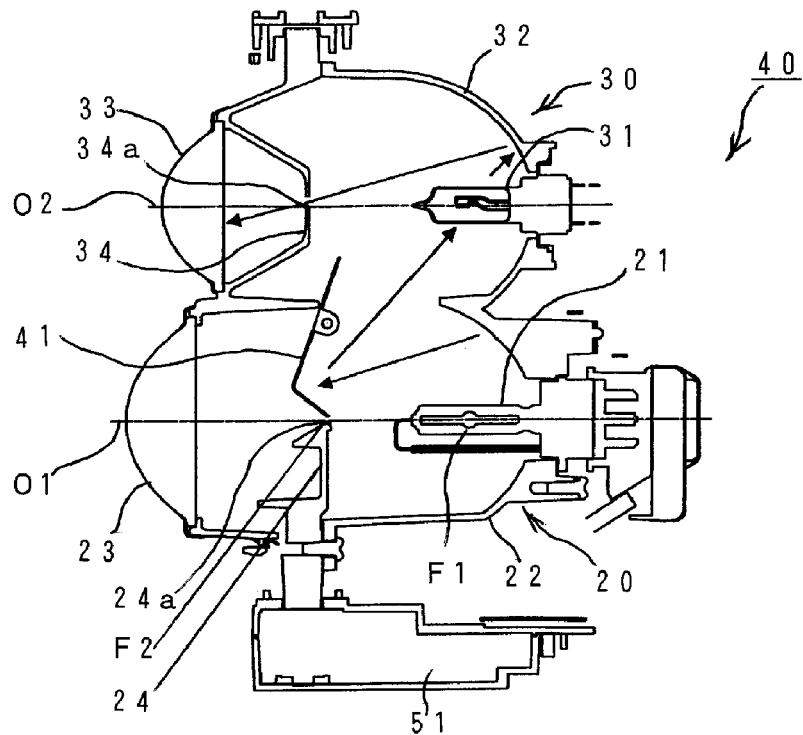
FIGS. 8A and 8B are a schematic cross sectional view showing the configuration of a vehicle headlight in accordance with another exemplary embodiment of the presently disclosed subject matter in which a movable mirror is further located at an insertion position, and a schematic cross sectional view of the same vehicle headlight in which the movable mirror is located at a withdrawn position.
Figure 8B:
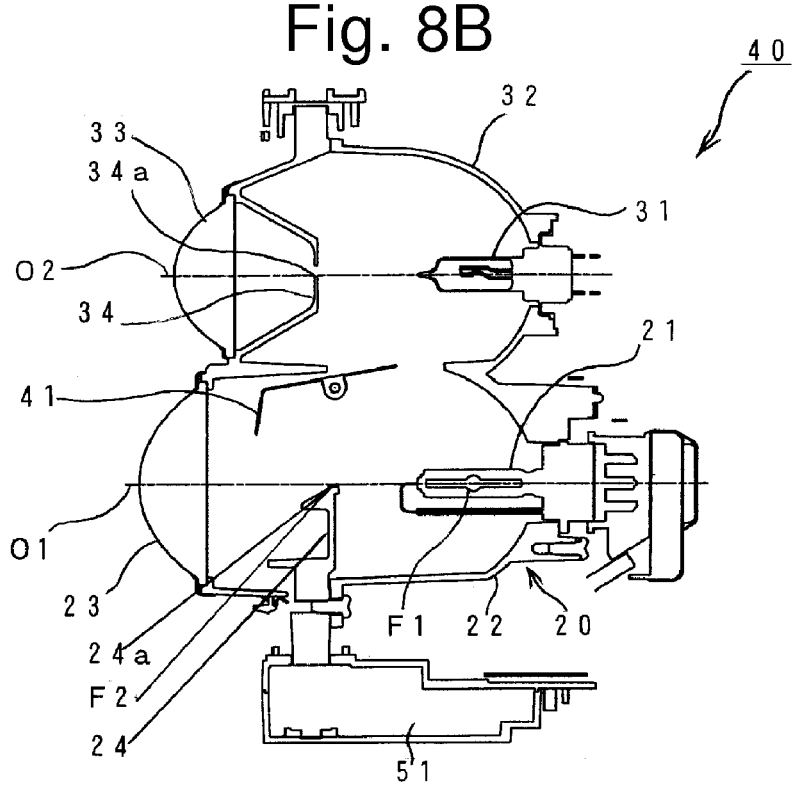

FIGS. 8A and 8B show a configuration of another exemplary embodiment of a vehicle headlight 40 made in accordance with principles of the presently disclosed subject matter. Since the vehicle headlight 40 shown in FIGS. 8A and 8B has almost the same configuration as that of the vehicle headlight 10 shown in FIGS. 2 and 3, the same or similar components thereof with respect to those of the headlight 10 are denoted by the same reference numerals and descriptions thereof are omitted.

The vehicle headlight 40 can be different from the above-described vehicle headlight 10 at least in that the first lamp unit 20 is provided with a movable mirror 41. The movable mirror 41 can be formed of an opaque material and include a reflecting surface. The movable mirror 41 is supported so as to move between an insertion position (see FIG. 8A) and a withdrawn position (FIG. 8B). When the movable mirror 41 is located at the insertion position, it is inserted into a light path from the reflector 22 to the projection lens 23 of the first lamp unit 20. When it is located at the withdrawn position, it does not adversely affect the light paths of both the first and second lamp units 20 and 30. When the movable mirror 41 is positioned at the insertion position, it can reflect part of light to be incident on the projection lens 23 of the first lamp unit 20 in order to direct it to the bulb 31 of the second lamp unit 30. In this instance, the part of light reflected by the movable mirror 41 is to otherwise be irradiated to an area below a predetermined angular position after passing through the projection lens 23.

It should be appreciated that the movable mirror 41 may be controlled to move to the insertion position only under adverse weather conditions (or other considerations), while it is controlled to be located at the withdraw position under normal weather conditions (or other considerations).

The vehicle headlight 40 configured as above has the movable mirror 41 located at the withdraw position normally (other than the case of adverse weather). In this case, the vehicle headlight 40 can provide the same effects as that of the vehicle headlight 10 shown in FIGS. 2 and 3. Conversely, under adverse weather conditions, the first and second lamp units 20 and 30 are simultaneously turned on, and the movable mirror 41 is controlled to move to the insertion position as shown in FIG. 8A. In this way, the movable mirror 41 can shade the part of light to otherwise be irradiated to an area below the predetermined angular position of the first lamp unit 20 (for example, at a position below the horizontal line by 2 degrees when the light is irradiated in the front road surface to prevent generation of dazzling light against the opposite vehicle). The shaded light is reflected by the movable mirror 41 toward the bulb 31 of the second lamp unit 30 to be advantageously utilized as illumination light. This configuration of the headlight can prevent part of light from becoming dazzling light against an opposite vehicle under adverse weather conditions. This can be achieved by the movable mirror 41, which reflects the part of light toward the bulb 31 of the second lamp unit 30. Accordingly, the reflected light can be utilized to form the light distribution pattern for traveling on a highway in conjunction with the light emitted from the bulb 31 of the second lamp unit 30. The light shaded by the movable mirror 41 is thus effectively utilized, thereby increasing the maximum luminous intensity of the second lamp unit 30.

It should be appreciated that the control of the movable mirror 41 can be achieved automatically in accordance with weather conditions or other conditions, or by manual operation.

Figure 9:
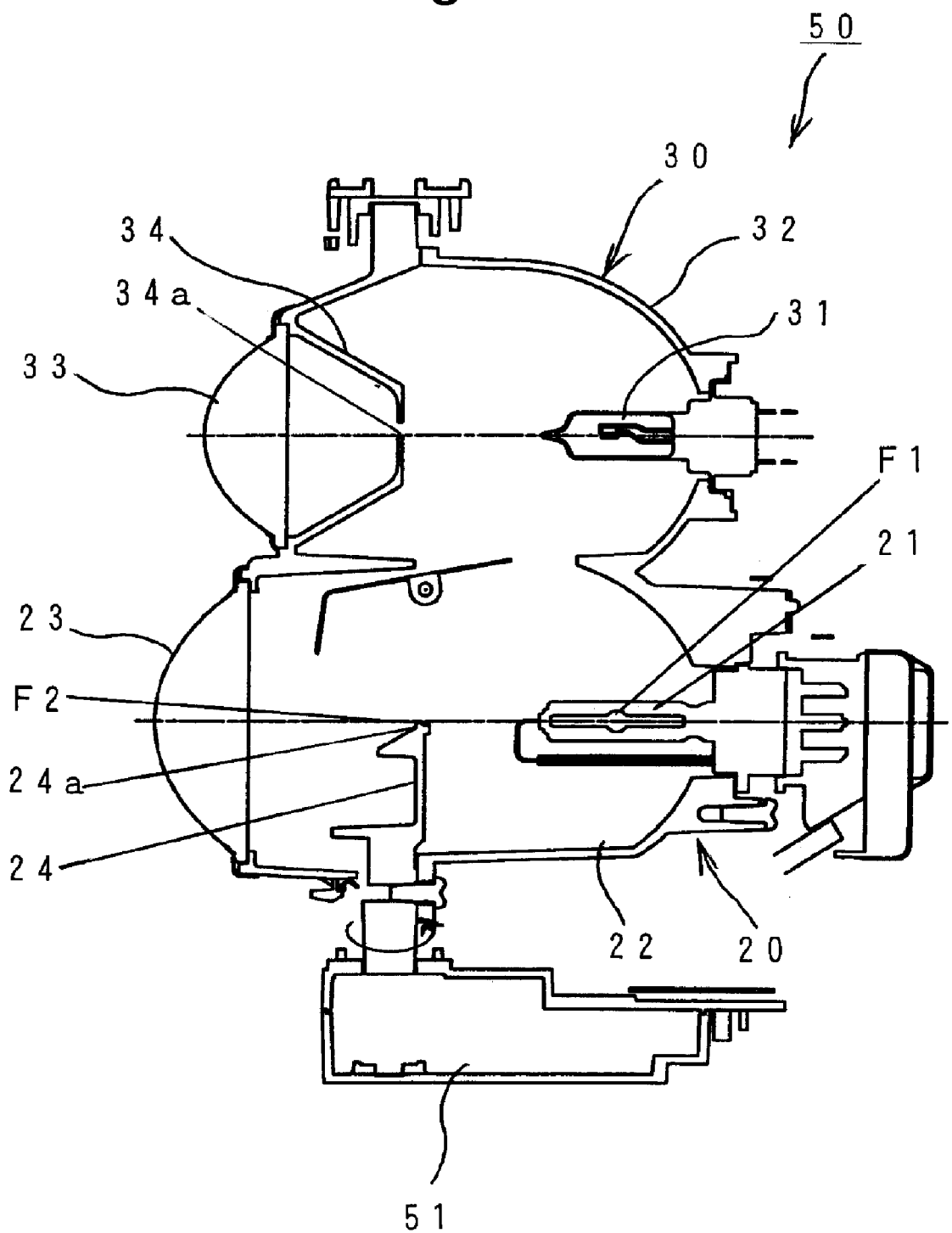
FIG. 9 is a schematic cross sectional view showing the configuration of a vehicle headlight in accordance with still another exemplary embodiment of the presently disclosed subject matter.

FIG. 9 shows the configuration of still another exemplary embodiment of a vehicle headlight made in accordance with principles of the presently disclosed subject matter.

In FIG. 9, the vehicle headlight 50 can have almost the same configuration as that of the vehicle headlight 40 shown in FIGS. 8A and 8B. Thus, the same or similar components thereof (with respect to the headlight 40) are denoted by the same reference numerals and descriptions thereof are omitted.

The vehicle headlight 50 can include a swing mechanism 51 in addition to the configuration of the vehicle headlight 40. The swing mechanism 51 can integrally swing the first and second lamp units 20 and 30 around a vertical rotation axis 51a in left and right directions.

In this configuration, the swing mechanism 51 can be controlled so as to integrally swing the first and second lamp units 20 and 30 and direct them to the traveling direction in accordance with, for example, the steering angle when traveling along a curved road.

Accordingly, during normal traveling (straight forward traveling), the swing mechanism 51 can hold the first and second lamp units 20 and 30 in the front direction. In this instance, the same effect as those of the above-described vehicle headlights 10 and 40 can be attained. On the other hand, during traveling along a curved road, the swing mechanism 51 can integrally swing the first and second lamp units 20 and 30 in accordance with the varied steering angle of the vehicle. In this manner, the light emitted from the headlight can be directed to the traveling direction of the vehicle. This can improve the visibility in the traveling direction of the vehicle even when traveling along a curved road.

It should be appreciated that the vehicle headlight 50 may have a movable mirror, if required.

Figure 10:
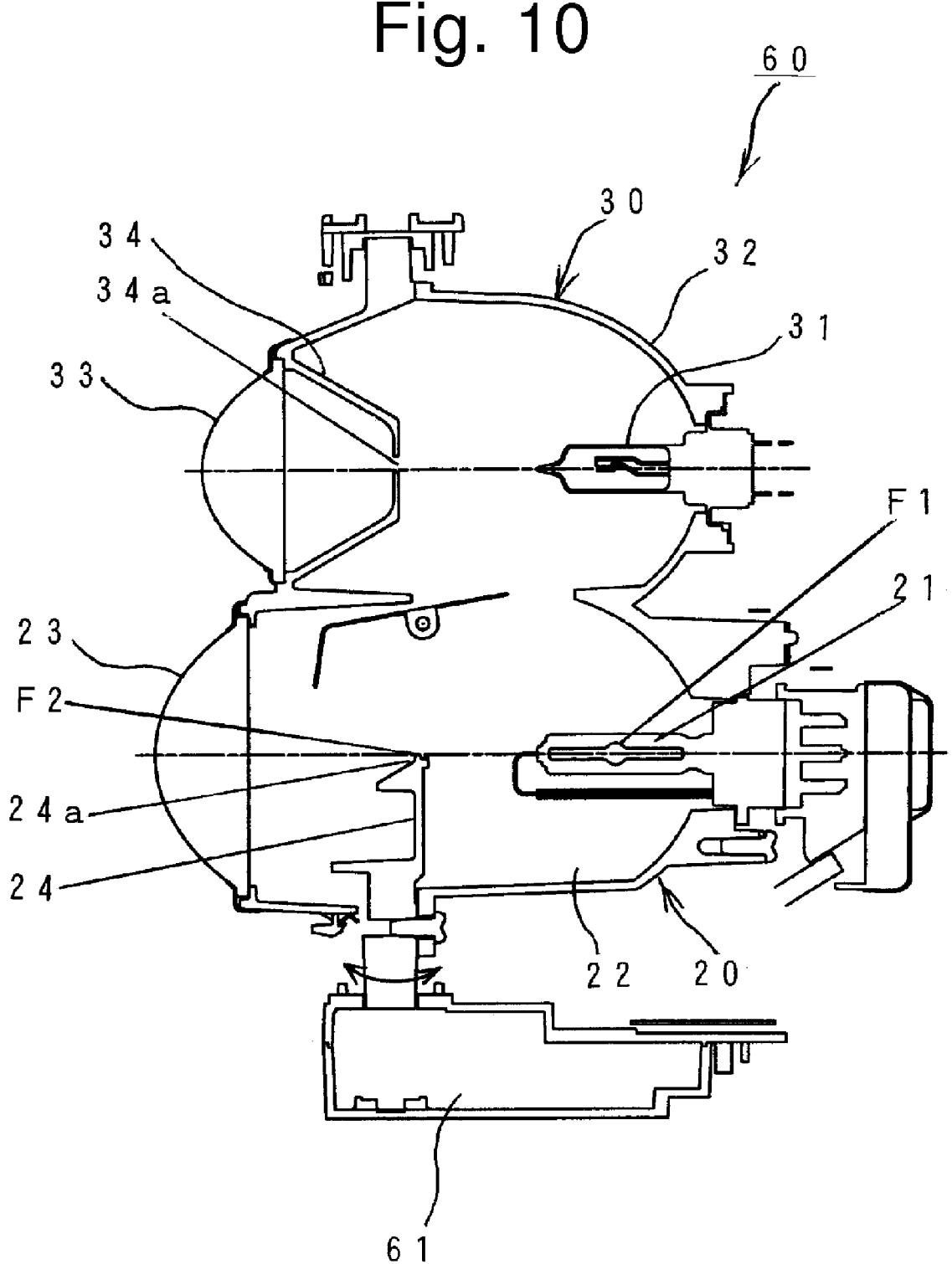
FIG. 10 is a schematic cross sectional view showing the configuration of a vehicle headlight in accordance with a further exemplary embodiment of the presently disclosed subject matter.

FIG. 10 shows the configuration of yet another exemplary embodiment of a vehicle headlight 60 made in accordance with principles of the presently disclosed subject matter.

In FIG. 10, the vehicle headlight 60 can have almost the same configuration as that of the vehicle headlight 40 shown in FIGS. 8A and 8B. Therefore, the same or similar components thereof as compared to those of the headlight 40 are denoted by the same reference numerals and descriptions thereof are omitted.

The vehicle headlight 60 can include a leveling mechanism 61 in addition to the configuration of the vehicle headlight 40. The leveling mechanism 61 can integrally swing the first and second lamp units 20 and 30 around a horizontal axis in front and rear directions of the vehicle (pitching direction), wherein the horizontal axis extends in the right-to-left direction of the vehicle (and into the page of FIG. 10).

In this configuration, the leveling mechanism 61 can be controlled so as to integrally hold the attitude of the first and second lamp units 20 and 30, when, for example, heavy baggage is loaded in the vehicle's trunk, or the vehicle accelerates or decelerates its speed, has a load change, etc.

Accordingly, the leveling mechanism 61 can hold the first and second lamp units 20 and 30 at a predetermined vertical angular position under normal conditions. In this instance, the same effect as those of the above-described vehicle headlights 10 and 40 can be attained. On the other hand, the leveling mechanism can integrally swing the first and second lamp units in the vertical direction around the horizontal axis in accordance with the slanting angle of the vehicle in the front-to-rear direction. By doing so, the optical axis of the headlight can be corrected to be located at a predetermined angular position. Accordingly, the light distribution patterns of the first and second lamp units 20 and 30 can be maintained even when the vehicle slants in the pitching direction, to provide the optimum light distribution pattern with improved visibility.

It should be appreciated that the vehicle headlight 60 may have a movable mirror 51 and/or a swing mechanism 61, if desired.

In the vehicle headlight 10, the low beam distribution pattern and the highway mode light distribution pattern can be formed using the first lamp unit 20 for the low beam and the second lamp unit 30 for the highway mode. The vehicle headlight in accordance with any of the exemplary embodiments may include the leveling mechanism in accordance with the previous exemplary embodiment to adjust its light distribution patterns. In this case, the first and second lamp units 20 and 30 are controlled in accordance with the operation control program of the actuator of the leveling mechanism and swung in the pitching direction to adjust the light distribution patterns. This may be done, for example, in the case where the cut-off line of the light-shading member for the highway mode distribution pattern should be varied depending on the traveling speed, in the case where the specification for a right-side or left-side traffic system is changed in accordance with the domestic traffic system, and the like.

In this manner, using the leveling mechanism to adjust the light distribution patterns can provide more moderate change amount of light distribution pattern with respect to the moving amount of the units than the case where the light-shading member is moved to achieve this. Accordingly, it is possible to cope with the requirements with respect to various specifications.

It should be appreciated that, in the above-described exemplary embodiments, the light-shading member 34 is configured to allow the cut-off line to be located at an angular position below the horizontal line by 0.4 degrees or 0.23 degrees, but the presently disclosed subject matter is not limited thereto. Alternatively, the angular position can be appropriately set in accordance with the various specifications for a highway mode light distribution and/or desire of the operator or manufacturer of the vehicle.

While there has been described what are at present considered to be exemplary embodiments of the invention, it will be understood that various modifications may be made thereto, and it is intended that the appended claims cover such modifications as fall within the true spirit and scope of the invention.

What is claimed is:

1. A vehicle light comprising:
   a first lamp unit including,
      a first light source having an optical axis which horizontally extends in a forward direction,
      a first elliptic reflector having a first focus and a second focus, the first elliptic reflector configured to reflect light from the first light source in the forward direction, the first focus being located in the vicinity of the first light source, the second focus being located substantially on the optical axis of the first light source,
      a first convex projection lens having a first light source side and a focus on the first light source side being located substantially on the optical axis of the first light source and in the vicinity of the second focus of the first elliptic reflector, and
      a first light-shading member located in the vicinity of the second focus of the first elliptic reflector, the first light-shading member having an upper edge configured to form a cut-off line in a light distribution pattern; and
   a second lamp unit including,
      a second light source having an optical axis which horizontally extends in the forward direction,
      a second elliptic reflector having a primary focus and a secondary focus, the second elliptic reflector configured to reflect light from the second light source in the forward direction, the primary focus being located in the vicinity of the second light source, the secondary focus being located substantially on the optical axis of the second light source,
      a second convex projection lens having a second light source side and a focus on the second light source side which is located substantially on the optical axis of the second light source and in the vicinity of the secondary focus of the second elliptic reflector, and
      a second light-shading member located in the vicinity of the secondary focus of the second elliptic reflector, the second light-shading member having an upper edge configured to form a cut-off line in another light distribution pattern, wherein the second lamp unit is located adjacent to the first lamp unit and one of vertically above and below the first lamp unit; and a movable mirror, wherein an opening is provided at a boundary between the first and second lamp units, and the movable mirror is movable between an insertion position at which the movable mirror reflects light emitted from the first lamp unit toward the second elliptic reflector of the second lamp unit through the opening, and a withdrawn position at which the movable mirror is withdrawn from light paths of the first and second lamp units.

2. The vehicle light according to claim 1, wherein the first lamp unit is configured to form a first light distribution pattern for passing-by traveling by the first light-shading member being configured to locate the cut-off line at an angular position below a horizontal line by a predetermined angle, and wherein the second lamp unit is configured to form a second light distribution pattern for traveling on a highway by the second light-shading member being configured to locate the cut-off line at an angular position below a horizontal line by a smaller angle than the predetermined angle.

3. The vehicle light according to claim 2, wherein the predetermined angle is 0.57 degrees, and the smaller angle than the predetermined angle is one of 0.4 degrees and 0.23 degrees.

4. The vehicle light according to claim 3, further comprising:

a control unit configured to control operation of the light such that when traveling in a first mode, only the first lamp unit is turned on while, when traveling in a second mode, both the first lamp unit and the second lamp unit are simultaneously turned on.

5. The vehicle light according to claim 3, further comprising:

a swing mechanism configured to swing the first lamp unit and the second lamp unit in a horizontal direction with respect to a traveling direction of the vehicle light when traveling in a particular mode.

6. The vehicle light according to claim 3, further comprising:

a leveling mechanism configured to swing the first lamp unit and the second lamp unit in a front-to-rear direction about a horizontally extending axis, the horizontally extending axis also extending perpendicular to the optical axes of the first and second lamp units, wherein the leveling mechanism is configured to maintain a positional orientation of the optical axes of the first and second lamp units when a vehicle body to which the vehicle light is attached slants in a pitching direction.

7. The vehicle light according to claim 2, further comprising:

a control unit configured to control operation of the light such that when traveling in a first mode, only the first lamp unit is turned on while, when traveling in a second mode, both the first lamp unit and the second lamp unit are simultaneously turned on.

8. The vehicle light according to claim 2, further comprising:

a swing mechanism configured to swing the first lamp unit and the second lamp unit in a horizontal direction with respect to a traveling direction of the vehicle light when traveling in a particular mode.

9. The vehicle light according to claim 2, further comprising:

a leveling mechanism configured to swing the first lamp unit and the second lamp unit in a front-to-rear direction about a horizontally extending axis, the horizontally extending axis also extending perpendicular to the optical axes of the first and second lamp units, wherein the leveling mechanism is configured to maintain a positional orientation of the optical axes of the first and second lamp units when a vehicle body to which the vehicle light is attached slants in a pitching direction.

10. The vehicle light according to claim 1, further comprising:

a control unit configured to control operation of the light such that when traveling in a first mode, only the first lamp unit is turned on while, when traveling in a second mode, both the first lamp unit and the second lamp unit are simultaneously turned on.

11. The vehicle light according to claim 10, further comprising:

a swing mechanism configured to swing the first lamp unit and the second lamp unit in a horizontal direction with respect to a traveling direction of the vehicle light when traveling in a particular mode.

12. The vehicle light according to claim 10, further comprising:

a leveling mechanism configured to swing the first lamp unit and the second lamp unit in a front-to-rear direction about a horizontally extending axis, the horizontally extending axis also extending perpendicular to the optical axes of the first and second lamp units, wherein the leveling mechanism is configured to maintain a positional orientation of the optical axes of the first and second lamp units when a vehicle body to which the vehicle light is attached slants in a pitching direction.

13. The vehicle light according to claim 1, further comprising:

a swing mechanism configured to swing the first lamp unit and the second lamp unit in a horizontal direction with respect to a traveling direction of the vehicle light when traveling in a particular mode.

14. The vehicle light according to claim 13, further comprising:

a leveling mechanism configured to swing the first lamp unit and the second lamp unit in a front-to-rear direction about a horizontally extending axis, the horizontally extending axis also extending perpendicular to the optical axes of the first and second lamp units, wherein the leveling mechanism is configured to maintain a positional orientation of the optical axes of the first and second lamp units when a vehicle body to which the vehicle light is attached slants in a pitching direction.

15. The vehicle light according to claim 1, further comprising:

a leveling mechanism configured to swing the first lamp unit and the second lamp unit in a front-to-rear direction about a horizontally extending axis, the horizontally extending axis also extending perpendicular to the optical axes of the first and second lamp units, wherein the leveling mechanism is configured to maintain a positional orientation of the optical axes of the first and second lamp units when a vehicle body to which the vehicle light is attached slants in a pitching direction.

* * * * *